United States Patent [19]
Miller et al.

[11] Patent Number: 6,074,727
[45] Date of Patent: Jun. 13, 2000

[54] METHOD FOR ADHERING MATERIALS HAVING DIFFERING EXPANSION PROPERTIES AND ARTICLES PRODUCED THEREFROM

[75] Inventors: Jeremy P. Miller, Dalton, Mass.; Venkatakrishnan Umamaheswaran, Farmington Hills, Mich.; Kurt A. Weiss, Stephentown, N.Y.; Charlie W. Wood, Peru, Mass.

[73] Assignee: General Electric Company, Pittsfield, Mass.

[21] Appl. No.: 08/292,887

[22] Filed: Aug. 16, 1994

Related U.S. Application Data

[63] Continuation of application No. 08/018,992, Feb. 18, 1993, abandoned.

[51] Int. Cl.[7] .................................................. B32B 7/12
[52] U.S. Cl. ..................... 428/198; 428/212; 428/481; 428/537.1; 428/537.5
[58] Field of Search .............................. 428/198, 537.1, 428/537.5, 481, 543, 212

[56] References Cited

U.S. PATENT DOCUMENTS

| | | | |
|---|---|---|---|
| 2,465,319 | 3/1949 | Whinfield et al. | 260/75 |
| 2,901,466 | 8/1959 | Kilber et al. | 260/75 |
| 3,023,192 | 2/1962 | Shivers, Jr. | 260/75 |
| 3,047,539 | 7/1962 | Pengilly | 260/75 |
| 3,651,014 | 3/1972 | Witsiepe | 260/75 R |
| 3,763,109 | 10/1973 | Witsiepe | 260/75 R |
| 3,766,146 | 10/1973 | Witsiepe | 260/75 R |
| 3,784,520 | 1/1974 | Hoeschele | 260/75 R |
| 3,801,547 | 4/1974 | Hoeschele | 260/75 M |
| 4,034,013 | 7/1977 | Lane | 260/835 |
| 4,096,202 | 6/1978 | Farnham et al. | 260/873 |
| 4,156,774 | 5/1979 | Buxbaum et al. | 528/273 |
| 4,180,494 | 12/1979 | Fromuth et al. | 525/63 X |
| 4,264,761 | 4/1981 | McGirk | 528/300 |
| 4,355,155 | 10/1982 | Nelsen | 528/301 |
| 4,556,688 | 12/1985 | McCready et al. | 525/33 |
| 4,556,705 | 12/1985 | McCready | 528/289 |
| 4,706,112 | 11/1987 | Faroudja et al. | 358/31 |
| 4,760,112 | 7/1988 | McCready et al. | 525/33 |
| 5,198,278 | 3/1993 | Sumimoto et al. | 428/198 X |

FOREIGN PATENT DOCUMENTS

| | | |
|---|---|---|
| 0 345 134 | 12/1989 | European Pat. Off. . |
| 0 547 504 | 6/1993 | European Pat. Off. . |
| 21 02 007 | 8/1972 | Germany . |
| 40 04 103 | 8/1991 | Germany . |
| 1 403 185 | 8/1975 | United Kingdom . |
| 92 22619 | 12/1992 | WIPO . |

OTHER PUBLICATIONS

Research Disclosure—vol. 1991, No. 328, Havant GB, XP217923 Anonymously 'High Initial Tack Composite Adhesive'; Aug. 1991.

Section 4 Application, Fabrication, and Installation from Decorative Laminates Article.

Recommended Application, Fabrication & Assembly, Technical Data, etc. from Formica Colorcore Brochure.

Fabricating With COLORCORE® Brand Surfacing Material from Formica Laminating Manual.

*Primary Examiner*—Blaine Copenheaver

[57] ABSTRACT

The present invention relates to a novel composite adhesive used to adhere coating materials onto a substrate wherein the substrate material and the coating material have significantly different expansion properties, e.g., thermoplastic coating materials onto cellulose based substrate materials. The composite adhesive comprises both a rigid adhesive such as an epoxy or acrylic and a laminating adhesive such as a rubber based contact cement. In a preferred embodiment of the invention, the composite adhesive is used in preparing composite articles such as counters, sinks, furniture, profile edging, chemical resistant lab tops, showers, etc. In another preferred embodiment according to the invention, the rigid adhesive is applied over a narrow portion of the coating material, substrate, or both, preferably the exterior region of said material, and the laminating adhesive is applied over the remainder of the surface area to be adhered. By the techniques of the present invention, it is also possible to adhere together several individual articles of manufacture so as to create a virtually seamless appearance between the individual articles of manufacture.

31 Claims, No Drawings

METHOD FOR ADHERING MATERIALS HAVING DIFFERING EXPANSION PROPERTIES AND ARTICLES PRODUCED THEREFROM

This is a continuation of application Ser. No. 08/018,992 filed on Feb. 18, 1993, now abandoned.

FIELD OF THE INVENTION

The present invention is directed to a method for adhering materials that have significantly different expansion properties as well as the articles produced therefrom. In particular, the present invention employs a composite adhesive comprising a rigid adhesive and a laminating adhesive. This rigid adhesive and laminating adhesive are applied separately to different portions of either the substrate material, the coating material, or both. The substrate and coating are then attached to one another in a permanent fashion. The present invention also relates to composite articles of manufacture such as counters, furniture, cabinets, work surfaces, profile edging, etc., which are made by the present process.

BACKGROUND OF THE INVENTION

Laminate materials come in various types and have a wide variety of end uses. One area of laminate materials that has been very active is high-pressure decorative laminates or HPDLs. High pressure decorative laminates are used in such applications as countertops (hereinafter referred to as counters), desk tops, cabinets, wall paneling, furniture, etc. There are about seven different types of HPDLs; namely, general-purpose, post-forming, cabinet-liner, backer, specific-purpose, high-wear, and fire-rated. Each of these types of laminate materials are usually constructed out of a coating material such as a laminate, a substrate and some type of adhesive.

In the past, one of the most popular types of laminate materials has been paper based laminates such as Formica®. Typically, the substrate material for a Formica®-type product is also a wood based material such as particleboard. However, Formica® has a number of problems in that it is very brittle, susceptible to stress cracking, difficult to process, and difficult to repair. Consequently, Formica® is relatively limited in its application.

Thus, it would be desirable to use different types of coating materials which do not suffer from the drawbacks of paper based laminates such as Formica®, and which allow for a wider variety of end-use applications. For example, it would be highly desirable to employ a thermoplastic material such as a polyester or even a thermosetting resin, depending on the particular application desired. By the same token, it would also be desirable to vary the substrate materials depending on the end-use application and the desired cost.

However, the present inventors discovered that one of the most difficult problems associated with employing polymer based coating materials with different types of substrates, e.g., cellulose based substrates or the like, is that the two materials usually have very different expansion properties. For example, the coefficient of thermal expansion between, e.g., a polyester resin and, e.g., particleboard, can be an order of magnitude or more different from one another. Because the different layers expand at substantially different rates and to significantly different degrees, the coating material and the substrate are particularly susceptible to separation one from another. This problem is unique as compared to Formica®, because Formica® and the wood based substrate to which it is adhered tend to have very similar expansion properties.

Accordingly, it is an object of the present invention to effectively adhere together a substrate and a coating material having significantly different expansion properties using a composite adhesive.

It is also an object of the present invention to provide a composite article of manufacture with a substrate and a coating material adhered to one another in such a manner that they do not separate even when expanding at different rates.

SUMMARY OF THE INVENTION

The present invention provides a composite article of manufacture comprising a substrate material, a coating material, and a composite adhesive. The substrate and coating material are such that they have significantly different expansion properties. The composite adhesive comprises a suitable rigid adhesive and a suitable laminating adhesive which are used in combination.

The present invention also provides a method for adhering a substrate and a coating material having significantly different expansion properties. The method comprises applying a rigid adhesive and a laminating adhesive to the substrate, the coating, or both. Next, the substrate and coating are attached to one another by means of the adhesive materials.

In a particularly preferred embodiment of the present invention, the substrate comprises a cellulose based material such as particleboard, fiberboard or plywood, and the coating material comprises a thermoplastic material such as polyester, polyolefin, polycarbonate, polyetherimide, polyamide, or the like. In a particularly preferred application such as the fabrication of counters, the rigid adhesive is preferably applied as a thin strip around the exterior portion of the substrate, coating, or both, and the laminating adhesive is applied over the remainder of the substrate and/or coating.

DETAILED DESCRIPTION OF THE INVENTION

Composite articles of manufacture such as laminate materials and the like are typically constructed with a base substrate and a coating material. When the coating material is a paper based laminate such as Formica® and the substrate is also a wood based material, it is usually possible to adhere the substrate and laminate with a simple contact adhesive. This is possible because the substrate and laminate are formed from similar materials and thus tend to contract and expand at similar rates and to similar degees. However, the more the substrate and coating materials differ in their expansion properties the more difficult it becomes to maintain suitable adherence between them.

Accordingly, as one aspect of the present invention resides in the use of substrate and coating materials that vary significantly in their expansion properties, the present invention employs the use of a composite adhesive material which is comprised of both a rigid adhesive and a laminating adhesive. It is important to note that by the term "composite adhesive" it is not meant that two or more adhesives are physically combined into a single formulation. Rather, it is intended to imply that two separate adhesives are used in the overall article of manufacture, albeit in different locations.

Rigid adhesives are well known and well understood by those skilled in the art. The present invention contemplates the use of any suitable rigid adhesive. The term "suitable rigid adhesive" is intended to include any rigid adhesive which is adhesively compatible with the selected substrate and coating materials and which has sufficient adhesive strength to retain the bond between the coating and the substrate when the two material have significantly different expansion properties. For example, supposing that the coating comprises a thermoplastic blend of polyalkylene terephthalate and polycarbonate and supposing that the substrate comprises a cellulose based material such as particleboard or fiberboard, a suitable rigid adhesive could be fashioned from a solid surfacing adhesive material such as an acrylic or epoxy adhesive.

Depending upon the nature of the substrate and coating materials, there are a number of rigid adhesives that are particularly preferred according to the present invention. As indicated above, it is preferred to use a solid surfacing adhesive material with the substrates and coatings of the present invention, especially when the coatings are thermoplastic in nature. Additionally, it is even more preferred to employ the following solid surfacing rigid adhesives; acrylic adhesives, epoxy based adhesives, urethane adhesives, cyanoacrylate adhesives, and mixtures thereof. There are a number of other solid surfacing rigid adhesives that are preferred when the coating material is other than a thermoplastic or thermosetting resin. For example, it is possible to employ cellulose-compatible rigid adhesives such as vinyl acetate when the substrate and coating materials are cellulose based materials.

The amount of the rigid adhesive used in the composite adhesive is not critical. Thus, is possible to use very high percentages of rigid adhesive in the overall composite adhesive. However, due to the higher cost of the rigid adhesive, it is preferred to employ as little rigid adhesive as possible and still achieve sufficient adhesion between the substrate and coating materials. In this regard, it is possible to employ very low levels of rigid adhesive. In fact, the amount of rigid adhesive as a percentage of the overall composite adhesive need only be sufficient to withstand the pulling forces associated with the differing expansion properties between the substrate and the coating materials.

For example, it is preferred that the amount of rigid adhesive be no greater than about 75% by weight of the composite adhesive. It is more preferred that the amount of rigid adhesive be no greater than about 25% by weight of the composite adhesive. It is even more preferred that the amount of rigid adhesive be no greater than about 5% by weight of the composite adhesive.

The second component in the composite adhesive is a laminating adhesive material. Laminating adhesives are also well known and well understood by those skilled in the art. Thus, the present invention contemplates the use of virtually any suitable laminating adhesive. The term "suitable laminating adhesive" is intended to include any solvent or non-solvent based laminating adhesive that has an adhesive strength sufficient to cause substrate failure, i.e., there is substrate failure, not adhesive failure, when two similar substrate materials which have been adhered together are separated. Additionally, it is also preferred that the suitable laminating adhesive be adhesively compatible with the substrate and coating materials.

The laminating adhesive performs a different function from the rigid adhesive. In particular, where the rigid adhesive is designed to firmly adhere the coating to the substrate even when they undergo expansion or contraction at different rates, the laminating adhesive is designed to permit the coating to "float", i.e., the laminating adhesive should provide some give between the coating and the substrate. Thus, the laminating adhesive is more flexible or elastic than the rigid adhesive.

In a preferred embodiment of the present invention, the laminating adhesive comprises at least one of the following: rubber based contact cements, urea-formaldehyde adhesives, resorcinol adhesives, phenol-resorcinol adhesives, casein adhesives, NBR or SBR based adhesives.

The amount of the laminating adhesive is not critical. Rather, the laminating adhesive is meant to supplement the rigid adhesive and thus it is used to cover those areas not covered by the rigid adhesive. For example, in one embodiment of the present invention, where the article of manufacture is a counter or the like, it is preferred to employ the rigid adhesive as a thin strip, e.g., approximately one inch in width over an 8 ft by 4 ft surface area, around the perimeter of the substrate material. The laminating material, e.g., contact cement, is then used to cover the remaining portion of the substrate material. Accordingly, the laminating material covers greater than about 90% of the overall surface area to be covered. In other words, the laminating adhesive comprises greater than 90% of the composite adhesive.

The present invention also allows for the use of a wide range of substrate materials, i.e., most of the substrate materials known in the art can be acceptable to the present invention. In a preferred embodiment of the invention, the substrate is comprised of cellulose based materials. Within the range of cellulose based substrates, particleboard, fiberboard and plywood are the more preferred. However, these materials are not critical. Rather, these materials are preferred primarily because of their wide acceptance and availability throughout the industry, as well as their relatively low cost. Thus, given the proper acceptance within the industry, it would be particularly preferable to employ a thermoplastic as the substrate material.

Just as with the substrate materials, one very important advantage of the present invention is the ability to employ a wide variety of coating materials. For example, the present invention is able to accommodate virtually any coating material and almost any substrate provided there exists a suitable rigid adhesive and a suitable laminating adhesive for the combination. This capability exists because the present invention is able to overcome the problems associated with employing coating and substrate materials having significantly different expansion properties.

The term "expansion properties" is intended to include expansion or contraction of the substrate and/or coating material from whatever source. The term "significantly different expansion properties" is intended to include a combination of materials with substantilly different thermal coefficients of expansion or substantially different expansion due to moisture, etc. The most common sources of expansion are temperature and moisture, with expansion due to temperature being measured by the coefficient of thermal expansion.

In keeping with the present invention and since the most common-used substrate materials are made of wood, it is preferred that the coating material comprise a non-cellulose based material. The preferred non-cellulose based coating materials are thermoplastic and thermosetting resins, with the thermoplastic resins being the more preferred.

Thermoplastic resin coatings are particularly preferred according to the present invention because of the host of advantages they provide over cellulose based materials. First, modified thermoplastic coatings generally provide better impact resistance. Thermoplastic coatings also provide better reparability as compared to, e.g., Formica®, i.e., there is no change in color once you go beneath the surface of the thermoplastic whereas the layers beneath the Formica® coating typically have a color different than the surface coating. Additionally, thermoplastics such as a polyester/polycarbonate blend can be glued together with almost no evidence of a seam between the two thermoplastic parts, i.e., they can be adhered to one another at a joint to create a virtually seamless appearance. To the contrary, when using laminates such as Formica®, it is easy to detect the joints where two laminates have been adhered together. Another unique advantage of the thermoplastics such as those employed in the countertop applications of the invention is the stain resistance that is provided to the surface of the counter. In particular, the present inventors have found that virtually all stains can be removed from the thermoplastic coating materials with the use of nothing more than a Scotch-brite® pad and ordinary household cleaner. Not surprisingly, thermoplastic coatings are also advantageous in that they can be thermoformed and post-formed.

There are a host of thermoplastic resins which find application in the present invention. For example, the list includes at least the following polymers and/or copolymers and/or blends where appropriate: polyesters, polycarbonates, polyetherimides, polyamides, polyester carbonates, polyphenylene sulfide, polyamideimides, polyarylates, polymethylpentenes, polysulfones, polyethersulfones, polystyrenes, rubber modified high impact polystyrenes, acetals, styrene acrylonitriles, styrene maleic anhydride (SMA), acrylonitrile styrene acrylate (ASA), modified polyphenylene ethers, polyether ketones, acrylonitrile butadiene styrene (ABS), chlorinated polymers such as polyvinyl chloride, fluorinated polymers such as perfluoroalkoxy (PFA), poly(ethylene-chlorotrifluoroethylene) (E-CTFE), poly(ethylene-tetrafluoroethylene) (E-TFE), polyvinylidene fluoride (PVDF), fluorinated ethylene-proplyene (FEP),etc., as well as liquid crystal polymers.

As described above, polyester resins are one of the more preferred classes of thermoplastic coatings. In this regard, the preferred polyester resins include polyalkylene terephthalate resins such as polyethylene terephthalate, polypropylene terephthalate, polybutylene terephthalate, polycyclohexyldimethylene terephthalate, as well as mixtures of the above. It is also advantageous to employ a secondary resin such as, e.g., a polycarbonate resin, to further enhance the properties of the polyester resin.

The polyesters derived from cyclohexanedimethanol are prepared by condensing either the cis- or trans-isomer (or a mixture thereof) of, for example, 1,4-cyclohexane dimethanol with a hexacarbocyclic dicarboxylic acid so as to produce a polyester. The preferred polyester resins may be derived from the reaction of a mixture of the cis- and trans-isomers of 1,4-cyclohexanedimethanol with a mixture of iso- and terephthalic acids.

These polyesters can be produced by well known methods in the art such as those set forth in U.S. Pat. No. 2,901,466. The poly(1,4-cyclohexanedimethanol terephthalate) is commercially available, e.g., under the name "KODAR" from Eastman Chemical Products Co.

Of course, it is to be understood that the preferred polyester resins used in this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue include terephthalic acid, trans-hexahydroterephthalic acid, p,p'-sulfonyldibenzoic acid, 4,4'-diphenic acid, 4,4-benzophenonedicarboxylic acid, 1,2-di(p-carboxyphenyl)ethane, 1,2-di(p-carboxyphenyl)ethane, 1,2-di(p-carboxyphenoxy)ethane, 4,4'-dicarboxydiphenyl ether, etc., and mixtures of these. All of these acids contain at least one hexacarbocyclic 1,5- or 2,6-naphthalenedicarboxylic acid. The hexacarbocyclic dicarboxylic acids are preferably those containing a transcyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid.

The high molecular weight polyesters are polymeric glycol esters of terephthalic acid and isophthalic acids. They are available commercially or can be prepared by known techniques. See, for example, U.S. Pat. No. 2,465,319 and U.S. Pat. No. 3,047,539.

Thermoplastic elastomeric materials suitable for use as impact modifiers include SBR, AB and ABA block copolymers such as "KRATON-D" and "KRATON-G"; styrene-butadiene modified acrylics; acrylic modifiers such as "EXL 2330" from Rohm & Haas Company; core shell acrylics such as "EXL 2691", also from Rohm & Haas; High rubber grafts ABS, EVA and EEA. polymers. These and other impact modifiers are described in U.S. Pat. Nos. 4,034,013; 4,096,202 and 4,180,494 and in Modern Plastics Encyclopedia; 1988 Edition, p. 160. Effective amounts are readily determined, e.g., by replacing part of the polyester component and measuring the impact strength of the resultant composition. Effective amounts will generally result in at least doubling the impact strength of the composition as measured in a standard test, for example, the notched Izod impact strength test, which is well known to those skilled in the art. In general, as mentioned above, effective amounts usually will be in the range of from about 1 to about 40 percent by weight based on the total weight of the resinous components.

Most preferred as impact modifiers are the family of engineering thermoplastic elastomers comprising copolyetherester and copolyetherimide ester resins. These include both random and block copolymers. They include also polyester hard block, polyester soft block-modified thermoplastic elastomers. In general these are prepared by conventional esterification/polycondensation processes from (a) one or more diols, (b) one or more dicarboxylic acids, (c) one or more long chain ether glycols, and/or a diamino terminated derivative thereof and, optionally, one or more caprolactones or polycaprolactones. In addition to being commercially available, the copolyether esters are described in U.S. Pat. Nos. 3,023,192; 3,651,014; 3,763,109; 3,766, 146; 3,784,520; 3,801,547; 4,156,774; 4,264,761; 4,355, 155; and 4,706,112. Suitable commercially-available copolyether esters include LOMOD® resins, all products of GE Plastics; HYTREL® thermoplastic elastomer resins, products of DuPont Company; RITEFLEX® resin, a product of Celanese Company; ARNITEL® resin, a product of AKZO Company; PELPRENE® resin, a product of TOYOBO Company, as well as others.

Suitable copolyetherimide esters for use as impact modifiers in the present invention are prepared by methods described by McCready et al in U.S. Pat. Nos. 4,556,688, 4,556,705 and 4,760,112. Many are also commercially available, such as the LOMOD® resins of GE Plastics.

It is further preferred to employ an inorganic filler to the polyester resin to impart a series of additional beneficial properties, not the least of which are thermal stability, increased density, and texture. Inorganic fillers are well known in the art and virtually any inorganic filler known in the art can be used in the present invention.

Typical inorganic fillers which are employed in thermoplastic resins in general, and polyesters in specific, include: zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, ground quartz as well as mixtures of the above. A few of the more preferred fillers include zinc oxide, barium sulfate, zirconium oxide, zirconium silicate, strontium sulfate, titanium dioxide, glass microspheres and mixtures of the above.

The molding compositions may include a resin as specified above with from 20–85% by weight, preferably 30–75% by weight or most preferably 30–45% by weight of total composition of filler component. For certain applications where a ceramic like product is desired, more than 50%, or more preferably 60–85% by weight of the total composition of filler component should be employed.

The thermoplastic resin coatings may also include other additives which are well known in the art. For example, the resin coatings may contain external lubricants, antioxidants, flame retardants or the like. If desired, fiberglass and/or other fibrous reinforcing fillers may be added as well as pigments, ultraviolet stabilizers, metal additives for electromagnetic radiation shielding such as nickel coated graphite fibers, anti static agents, coupling agents such as amino silanes and the like.

This invention is uniquely applicable to an article of manufacture wherein the substrate and coating materials have significantly different expansion properties. For example, using the coefficient of thermal expansion as one measure of expansion properties, the present invention is capable of accommodating differences in coefficient of thermal expansion on the order of at least 300%. That is, the coating material may have a coefficient of thermal expansion which is three (3) times that of the substrate material, or vice versa. It should be noted, however, that this degree of difference is equally applicable for expansion due to sources other than temperature, e.g., moisture, etc. In a preferred embodiment of the invention, the difference in expansion properties between the substrate and coating can be at least 500%. In a more preferred embodiment of the invention, the difference in expansion properties between the substrate and coating can be at least 750%, and most preferably, at least 1000%.

The preferred applications for the coatings and substrates according to the invention include those areas in which laminate materials and wood based substrates have predominated. As explained in the Background section of the invention, these areas include composite articles of manufacture such as counters, integrated sinks, desks, shower surrounds and other bathroom accessories, furniture, doors, appliance fascias, cabinets, work surfaces, profile edging, tile walls and chemical resistant lab tops, with the most preferred application being counters. When the article of manufacture is a counter, it is further preferred that the coating material comprise at least one polyester resin such as a polyalkylene terephthalate which optionally includes a polycarbonate, polyetherimide or other modifying resin.

Another unique advantage of the present invention that was discovered through the work with thermoplastic coated counters is the ability to adhere several counter pieces together at their respective joints without creating any appearance of a joint at that location. This unique advantage has been labeled by the present inventors as "a virtually seamless appearance." When adhering several different articles of manufacture together, it is preferred to employ the rigid adhesive according to the present invention in order to keep the parts together.

The present process begins by selecting suitable substrate and coating materials according to the end-use application. It is important to note that while the present process is suitable for virtually any combination of substrate and coating, it finds the most utility when the substrate and coating materials selected have significantly different expansion properties. After selecting the appropriate substrate and coating materials, one or both of them is covered with a suitable laminating adhesive and a suitable rigid adhesive over different portions thereof, i.e., the laminating adhesive and rigid adhesives are not physically combined into a single adhesive. Rather, the two adhesives are used over distinct portions of the substrate and/or coating material because they each serve independent functions within the broad realm of adhesion and because they tend to counteract one another if placed in physical contact. Finally, the substrate and coating need only be attached to one another in a manner that allows the rigid adhesive and laminating adhesive to effectively form a bond between the substrate and coating. For example, the combination of substrate, adhesive, and coating can be run through a set of pinch rollers, they can be hand rolled, or even clamped together if desired.

In order to further illustrate the present invention and the advantages thereof, the following specific examples are given, it being understood that the same are intended only as illustrative and in no wise limitative.

EXAMPLE 1

In an effort to demonstrate the effectiveness and utility of the present invention in a specific application such as countertops, an adhesive evaluation was conducted. The bond strength of a thermoplastic coating material, e.g., polyester based thermoplastic material (PBT/PET) modified and with polycarbonate and inorganic filler, to itself and two substrates using various adhesives was conducted as follows. The substrate materials used were ¾" thick particleboard and ¾" medium density fiberboard. The adhesives chosen were as follows:

| | |
|---|---|
| Elmers carpenters wood glue | PVA base |
| Corian joint adhesive | Methylmethacrylate |
| ITW 2X-78P adhesive | Methylmethacrylate |
| Ciba-Geigy LMH 627-88 adhesive | Epoxy |
| 3M 1357 contact cement | Solvent rubber base contact |
| 3M 30NF green adhesive | Water rubber base contact |
| Macklanburg-Duncan adhesive | Non-flammable rubber base contact |
| Macklanburg-Duncan adhesive | Solvent rubber base contact |
| Weldbond adhesive | PVA base |
| Hybond 95 adhesive | Solvent base contact |

Various combinations of similar and dissimilar coating/substrate materials were used in conjunction with the above-identified adhesives. The samples were prepared in both lap shear and butt-joint configurations. In the case of the lap joint samples an overlap of approximately 0.5" by 1.0" wide was used. The butt-joint area varied with the thickness of the sample. The wood products were 0.750" thick and the thermoplastic material was 0.125", in all cases the samples were 1.0" wide. All of the samples were assembled in the sample fashion and kept clamped while curing. Testing was done after 24 hours of cure time.

TABLE 1

Bonding Data
Thermoplastic to Thermoplastic
Tensile strength in psi
(standard deviation)

| Adhesive | Butt-weld | Lap-shear |
|---|---|---|
| ITW | 193 | 681 SF |
|  | 48 | 97 |
| Corian | 174 | 567 CF |
|  | 15 | 67 |
| Ciba-Geigy | 272 | 736 SF |
|  | 60 | 22 |

SF = substrate failure
AF = adhesive failure
CF = cohesive failure

TABLE 2

Bonding Data
Particleboard to Particleboard
Tensile strength in psi

| Adhesive | Butt Joint |
|---|---|
| ITW | 143 |
|  | 26 |
| Corian | 364 |
|  | 37 |
| Weldbond | SF |
| Ciba-Geigy | SF |
| Elmers | SF |

SF = substrate failure
AF = adhesive failure
CF = cohesive failure

TABLE 3

Bond Strength
Fiberboard to Fiberboard
Tensile strength in psi

| Adhesive | Butt Joint |
|---|---|
| ITW | 226 |
|  | 46 |
| Corian | 558 |
|  | 55 |
| Weldbond | SF |
| Ciba-Geigy | SF |
| Elmers | SF |

SF = substrate failure
AF = adhesive failure
CF = cohesive failure

TABLE 4

Bonding Data
Thermoplastic Material to Particleboard
Tensile Strength in psi

| Adhesive | Lap shear |
|---|---|
| 3M 30NF | 12 |
|  | 2.5 |
| 3M 1357 solvent | 100 |

TABLE 4-continued

Bonding Data
Thermoplastic Material to Particleboard
Tensile Strength in psi

| Adhesive | Lap shear |
|---|---|
|  | 23 |
| MD NF | 47 |
|  | 9 |
| MD solvent | 94 |
|  | 13 |
| Hybond 95 solvent | 117 |
|  | 20 |
| Weldbond | 251 |
|  | 15 |
| ITW | 362 |
|  | 21 |
| Corian | 369 |
|  | 34 |
| Ciba-Geigy | 450 |
|  | 36 |

SF = substrate failure
AF = adhesive failure
CF = cohesive failure

TABLE 5

Bonding Data
Thermoplastic Material to Fiberboard
Tensile Strength in psi

| Adhesive | Lap shear |
|---|---|
| 3M 30NF | 60 |
|  | 13 |
| 3M 1357 solvent | 79 |
|  | 9 |
| MD NF | 79 |
|  | 10 |
| MD solvent | 176 |
|  | 20 |
| Hybond 95 solvent | 248 |
|  | 26 |
| Weldbond | 341 |
|  | 37 |
| ITW | 550 |
|  | 45 |
| Corian | 577 |
|  | 25 |
| Ciba-Geigy | 806 |
|  | 31 |

SF = substrate failure
AF = adhesive failure
CF = cohesive failure

Discussion of Results

I. Thermoplastic to Thermoplastic

Both the ITW and Ciba-Geigy products give high lap shear and butt-weld strengths. These products performed better than the Corian adhesive that they were compared against. The lap shear samples were of sufficient strength to cause substrate failure.

II. Particleboard to Particleboard/Fiberboard to Fiberboard

All products performed well. The Ciba-Geigy adhesive generated substrate failure along with the more common wood adhesives. When comparing the wood products, the bonds to the fiberboard appeared to be stronger.

III. Thermoplastic to Particleboard/Fiberboard

The solvent based contact cements are stronger than their water based or non-flammable counterparts. Strengths are also typically higher when bonding to fiberboard. The structural adhesives showed much higher strengths when compared to the contact cements, and also higher values when bonded to fiberboard.

EXAMPLE 2

Samples of the thermoplastic material of Example 1 were prepared using Elmers white glue to determine its effectiveness as a bonding agent for use in countertops. Standard lap shear specimens were prepared bonding the thermoplastic material to itself, medium density fiberboard and particleboard. The results were as follows:

TABLE 6

Bond Data

I. Thermoplastic to Thermoplastic 60 psi
All adhesives failures

II. Thermoplastic to Particleboard 67 psi
Adhesive failure to thermoplastic

III. Thermoplastic to Fiberboard 105 psi
Adhesive failure to thermoplastic

None of the above combinations gave positive results. In all cases the glue did not adhere very well to the thermoplastic material. Elmers glue is based on polyvinyl acetate and has been traditionally used on porous substrates like wood and paper. PVA based products also have poor water resistance properties which could be a consideration in this application. In comparison to an earlier evaluation with various contact cements this product has higher shear strength but has poor adhesive quality to the thermoplastic.

EXAMPLE 3

The following additional data was collected in order to demonstrate the utility and advantages of the preferred counter (countertop) application. Four countertops were prepared using a ⅛" thermoplastic resin coating (at lease one polyalkylene terephthalate, polycarbonate and a filler) and a ¾" medium density particleboard substrate. All four countertops used rigid adhesive at the seams and joints. Two of the counters had rigid adhesive between the particleboard and the thermoplastic resin coating in a one inch width around the entire perimeter and underneath the seams. All samples had the same thermoplastic edges put on and routered to a flat surface before the coating was installed.

TABLE 7

Counter Samples

| Sample No. & Dimensions | Contact Adhesive | Rigid Adhesive | Perimeter |
| --- | --- | --- | --- |
| 1<br>7' × 25" rectangle | Hybond (solvent) | Ciba Geigy Epoxy | none |
| 2<br>7' × 25" rectangle | Hybond (solvent) | Ciba Geigy Epoxy | one inch |
| 3<br>7' × 25" rectangle | Hybond (solvent) | ITW Acrylic | none |
| 4<br>7' × 25" rectangle | Hybond (solvent) | ITW Acrylic | one inch |
| 5<br>7½' × 6' "L"<br>(w/kitchen sink) | Hybond (solvent) | Ciba Geigy Epoxy | one inch |

Environment

Small scale testing showed failures at −40° F. with all samples, so low temperatures were limited to −20° F. Similar failures were seen at 140° F., so high temperatures were limited to 120° F. High humidity at temperatures below freezing creates snow and frost, and impedes performance of the Thermotron®, so high humidity soaks were done at room temperature for 24 hours before bringing temperature down to extremes. Accordingly, the Thermotron® settings were as follows: (1) 24 hours at 95% humidity, (2) 24 hours at −20° F., and (3) 24 hours at 120° F. and minimal humidity (less than about 10%).

TABLE 8

Counter Sample Bond Data

| Sample No. | Effect | Comments |
| --- | --- | --- |
| 1 | Failure | Seams separated at low temperatures. Edges fell off at high temperatures. |
| 2 | No Effect | Some blistering (between thermoplastic resin coating and particle board) at high temp., but when temp. was brought down to room temp., blisters disappeared. |
| 3 | Failure | Seams separated at low temperatures. Edges fell of at high temperatures. |
| 4 | No Effect | Some blistering (between thermoplastic resin coating and particle board) at high temp., but when temp. was brought down to room temp., blisters disappeared. |
| 5 | No Effect | Very slight blistering. No problems with sharp corner. Kitchen sink bolted to long direction minimized distortion and blisters. |

From the above, it can be seen that the composite adhesive system according to the present invention is remarkably effective in preventing separation of the coating material from a substrate, even when the coating and substrate have significantly different expansion properties. In this regard, a relatively small amount of the rigid adhesive, either the acrylic or the epoxy, limited expansion and contraction of the counter composite. The one inch border of rigid adhesive also kept the edges from popping off and kept the seams together so that the virtually seamless appearance was maintained. Although blistering was a concern at very high temperature, the laminating adhesive successfully expanded with the materials and then pulled the top back to the substrate at room temperature.

EXAMPLE 4

The following example was conducted to demonstrate yet additional advantages of the present invention. Accordingly, several samples were constructed to simulate sheet, square edge, and postformed countertops in shipping. In Example 3, rigid adhesive was placed under the thermoplastic sheet in a one inch border, at the seams, and around the edges to limit expansion and contraction. Since this was impractical in a postforming operation, alternative methods were employed. The postformed edges took care of themselves. With the sheet being bent around 90 degree corners, the expansion and contraction in the depth dimension was somewhat limited by the off plane sheet (and adhesive). The worst growth was at the ends of the sheet or at the seams. In order to simulate the worst case, a seam was placed in the center of a simple countertop using rigid adhesive to produce an inconspicuous seam and hold the particleboard together. The edges were held fixed by having a one inch border of rigid adhesive around the perimeter of the top. This forced all expansion and contraction to try and occur at the seam. Besides the adhesive used to butt joint the two halves together, no rigid adhesive was used around the seams.

Sample Preparation

I. Two simple square edge countertops:

Substrate - medium density particleboard.
Dimensions - 7 ft × 25 in. rectangle.
Tops shared a one inch border of ITW rigid adhesive around the outside, and Hybond contact adhesive in the center.
Seams were as follows:
The tops had a seam in center of the lengthwise direction. The tops had a wood scab under particle board seam.
One top had ITW rigid adhesive for seams without a one inch border surrounding seam.
One top had a 25" × 1" spline placed at the seam between the particle board and the thermoplastic resin coating to limit expansion and contraction of the seam.

II. Two simple postform top simulations:

Substrate - medium density particleboard.
Dimensions - 7 ft × 25 in. rectangle.
The tops had no rigid adhesive around the outside edge.
Seams - none.
One top used Hybond contact adhesive.
One top used Morton Adhesives' one part water based urethane contact adhesive.

III. Postformed top:

Substrate - medium density particleboard.
Dimensions - 7 ft × 25 in. rectangle.
Seams - none.
Adhesive - Hybond contact adhesive Environmental Chamber Conditions The Thermotron® test chamber has the ability to change both temperature and humidity. Particleboard sees wide swings in expansion and contraction with changes in humidity. Coefficient of thermal expansion for particle board is very close to that of wood, and is an order of magnitude less than the thermoplastic resin coating. Therefore, the worse case scenario would involve a countertop acclimated to dry Arizona, and then shipped to the cold humid Northeast. The Thermotron was set up to mimic these conditions in varying levels of severity.

TABLE 9

Environmental Conditions

| Cycle | Time (hours) | Temperature (° F.) | Humidity (%) |
|---|---|---|---|
| 1 | 8 | 32 | 20 |
| 2 | 6 | 100 | 0 |
| 3 | 3 | 100 | 95 |
| 4 | 8 | 0 | 20 |
| 5 | 6 | 120 | 0 |
| 6 | 3 | 120 | 95 |
| 7 | 8 | −20 | 20 |
| 8 | 6 | 140 | 0 |
| 9 | 3 | 140 | 95 |
| 10 | 8 | −40 | 20 |
| 11 | 8 | 75 | 95 |

Results

I. Square Edge Countertops

The results of these examples are summarized in Tables 10 and 11, below. Table 10 represents the first square edge countertop sample and Table 11 represents the second square edge countertop sample.

TABLE 10

| Top | 32° F. | 100° F. | 0° F. | 120° F. |
|---|---|---|---|---|
| Simple butt joint | NE | NE | NE | blister in contact adhesive |
| Spline joint | NE | NE | NE | NE |
| Contact adhesive no rigid adhesive | edges mismatched | edges mismatched | edges mismatched | edges mismatched |
| Morton adhesive no rigid adhesive | edges mismatched | edges mismatched | edges mismatched | edges mismatched |
| Postformed top | NE | NE | NE | hot glue failure at backsplash |

TABLE 11

| Top | −20° F. | 140° F. | −400° F. | High Humidity |
|---|---|---|---|---|
| Simple butt joint | seam failure edge failure | total failure | | |
| Spline joint | NE | contact glue blistered | NE | NE |
| Contact adhesive no rigid adhesive | edges mismatched | edges mismatched | edges mismatched | slight edge mismatch |
| Morton adhesive no rigid adhesive | edges mismatched | edges mismatched | edges mismatched | edges mismatched |
| Postformed top | backsplash separation | contact glue blistered | edges mismatched | edges mismatched and separation |

The drastic difference in performance between the simple butt joint sample and the spline joint sample highlights the importance of proper fabrication. Teardowns after the experiments showed that the application of rigid adhesive around the perimeter of the simple butt joint sample was not as uniform as the spline joint sample. Rigid adhesive was found overlapping the contact adhesive (poor adhesion area), and in other areas very little rigid adhesive was found.

When compared to the simple butt joint, the spline joint totally eliminated any seam separation.

Warpage was evident on all samples. During the first cycle when temperatures were at 32° F., the ends curled up. In all other cycles, except for the last where the chamber was held at a high humidity for an extended period, the ends curled down. The time spent at high humidity (and high temperature) in the intermediate cycles was not enough to reintroduce moisture to the particleboard.

Edge mismatch (overlapping edges) on the contact adhesive sample was worse than on the Morton one part urethane adhesive sample. While the Morton adhesive did outperform contact adhesive, it alone was not be able to keep seams from separating on postformed tops.

The spline joint works to limit seam separation on square edge and postformed top seams. Properly applied rigid adhesive effectively limited both edge mismatch and seam separation. Poorly applied rigid adhesive may promote a "dead zone" found around square edge countertop perimeters. Postformed tops with butt joint seams may separate at the seam if temperature extremes are encountered.

If was also found that the Morton one part urethane adhesive was an environmentally friendly alternative to solvent based contact adhesive, but it alone did not solve expansion contraction issues in post formed tops.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including the equivalents thereof.

What is claimed is:

1. A composite article of manufacture, comprising:
   (A) a substrate material
   (B) a coating material having expansion properties on the order of 300% different than said substrate material, and
   (C) a composite adhesive comprising a suitable rigid adhesive and a suitable laminating adhesive which acts to bond said coating material to said substrate material wherein the rigid adhesive is no greater than 75% by weight of the composite adhesive.

2. The composite article manufacture according to claim 1, wherein said coating material comprises a non-cellulosic material.

3. A composite article of manufacture according to claim 2, wherein said coating material comprises a thermoplastic material.

4. The composite article of manufacture according to claim 3, wherein said thermoplastic material is selected from the group consisting of polycarbonate, polyetherimide, polyester, polyamide, polyester carbonates, polyphenylene sulfide, polyamideimide, polyarylate, polymethylpentene, polysulfone, polyethersulfone, polystyrene, rubber modified high impact polystyrene, acetyl, styrene acrylonitrile, styrene maleic adhydride, acrylonitrile styrene acrylate, modified polyphenylene ethers, polyether ketones, acrylonitrile butadiene styrene, chlorinated polymers, fluorinated polymers, liquid crystal polymers, or copolymers and blends of the above.

5. The composite article of manufacture according to claim 4, wherein said thermoplastic material comprises at least one polyester.

6. The composite article of manufacture according to claim 5, wherein said polyester is selected from the group consisting of polyethylene terephthalate, polypropylene terephthalate, polybutylene terephthalate, or polycyclohexyldimethylene terephthalate.

7. The composite article of manufacture according to claim 4, wherein said thermoplastic material comprises at least one polyester and at least one polycarbonate.

8. The composite article of manufacture according to claim 3, wherein said thermoplastic material further comprises an inorganic filler.

9. The composite article of manufacture according to claim 8, wherein said inorganic filler is selected from the group consisting of zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins glass microspheres, wollastonite, titanium dioxide, or ground quartz.

10. The composite article of manufacture according to claim 9, wherein said filler is selected from the group consisting of zinc oxide, barium sulfate, zirconium oxide, zirconium silicate, strontium sulfate, titanium dioxide, glass microspheres or mixtures thereof.

11. A composite article of manufacture according to claim 2, wherein said coating material comprises a thermosetting plastic material.

12. The composite article of manufacture according to claim 1, wherein said substrate material comprises a cellulosic based material.

13. The composite article of manufacture according to claim 12, wherein said cellulosic based material is selected from the group consisting of particleboard, fiberboard, or plywood.

14. The composite article of manufacture according to claim 13, wherein said suitable laminating adhesive has an adhesive strength sufficient to cause substrate failure when separated from said coating material.

15. The composite article of manufacture according to claim 1, wherein said substrate material comprises a thermoplastic material.

16. The composite article of manufacture according to claim 1, wherein said suitable rigid adhesive comprises a solid surfacing adhesive material.

17. The composite article of manufacture according to claim 16, wherein said solid surfacing adhesive is selected from the group consisting of acrylic adhesive, epoxy based adhesive, vinyl acetate adhesive, urethane adhesive or cyanoacrylate adhesive.

18. The composite article of manufacture according to claim 17, wherein the amount of said solid surfacing adhesive is sufficient to withstand the pulling forces associated with the differing expansion properties between said substrate and said coating materials.

19. The composite article of manufacture according to claim 16, wherein the amount of said rigid adhesive is no greater than about 50% by weight of said composite adhesive.

20. The composite article of manufacture according to claim 19, wherein the amount of said rigid adhesive is no greater than about 20% by weight of said composite adhesive.

21. The composite article of manufacture according to claim 20, wherein the amount of said rigid adhesive is no greater than about 10% by weight of said composite adhesive.

22. The composite article of manufacture according to claim 1, wherein said suitable laminating adhesive comprises a solvent based laminating adhesive.

23. The composite article of manufacture according to claim 1, wherein said suitable laminating adhesive comprises a non-solvent based laminating adhesive.

24. The composite article of manufacture according to claim 1, wherein said laminating adhesive is selected from the group consisting of rubber based contact cements, urea-formaldehyde adhesive, resorcinol adhesive, phenol-resorcinol adhesive, casein adhesive, nitrile rubber adhesive or styrene butadiene rubber adhesive.

25. The composite article of manufacture according to claim 1, wherein said significantly different expansion properties between said substrate material and said coating material is on the order of 500%.

26. The composite article of manufacture according to claim 1, wherein the difference in expansion properties between said substrate material and said coating material is on the order of 750%.

27. The composite article of manufacture according to claim 1, wherein the article of manufacture is selected from the group consisting of counters, integrated sinks, desks, shower surrounds and other bathroom accessories, furniture, doors, appliance fascias, cabinets, work surfaces, profile edging, tile walls or chemical resistant lab tops.

28. The composite article of manufacture according to claim 27, wherein said article of manufacture is a counter.

29. The composite article of manufacture according to claim 27, wherein the article of manufacture comprises at least two separate composite articles of manufacture adhered together with a suitable rigid adhesive so as to result in a single composite article of manufacture having a virtually seamless appearance.

30. The composite article of claim 1 wherein the rigid adhesive is no greater than 25% by weight of the composite adhesive.

31. The composite article of claim 1 wherein the surface laminating adhesive of the composite adhesive covers greater than about 90% of the overall surface area to be covered.

\* \* \* \* \*